J. A. COLE.
RECORDING APPARATUS.
APPLICATION FILED MAY 16, 1917.
1,283,084.
Patented Oct. 29, 1918.
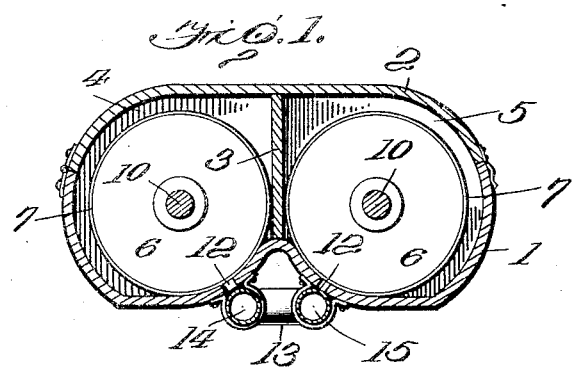
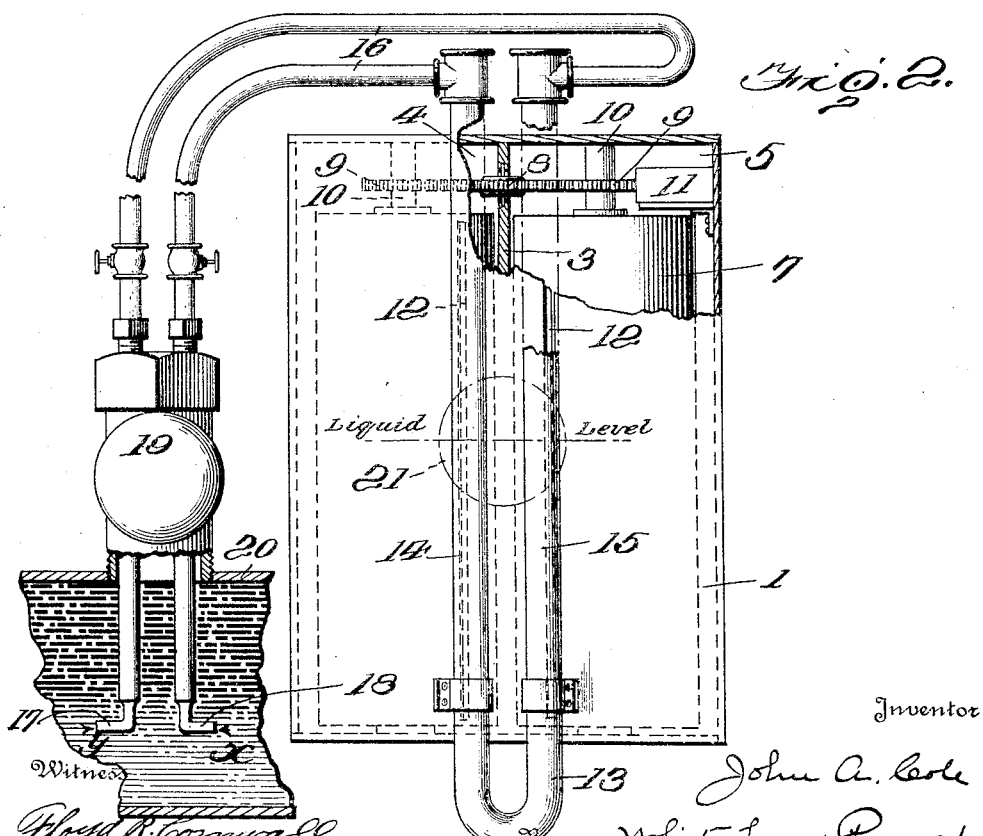

UNITED STATES PATENT OFFICE.

JOHN A. COLE, OF CHICAGO, ILLINOIS.

RECORDING APPARATUS.

1,283,084.

Specification of Letters Patent.

Patented Oct. 29, 1918.

Application filed May 16, 1917. Serial No. 169,099.

*To all whom it may concern:*

Be it known that I, JOHN A. COLE, a citizen of the United States, residing at Chicago, in the county of Cook and State of Illinois, have invented certain new and useful Improvements in Recording Apparatus; and I do hereby declare the following to be a full, clear, and exact description of the invention, such as will enable others skilled in the art to which it appertains to make and use the same.

My invention relates to improvements in manometers and particularly to that class of manometers in which an indicating medium is placed between a movable sensitized sheet and a source of light, whereby the movements of the indicating medium are photographed upon the sensitized sheet.

One form of manometer which has been in use for a number of years consists of a casing having a partition dividing the same into two compartments, one of which contains a movable drum carrying a sensitized record sheet and the other housing a source of light, the rays of which reach the sheet through a slot in the partition. Mounted on said partition is a transparent U-tube, one leg of which is interposed between the slot and the source of light, so that the movements of an indicating liquid in the leg of the U-tube opposite the slot will be recorded upon the sensitized sheet. This form of manometer is used in connection with a pitometer and measures the water flowing through a main. This device operates successfully where the water in the main flows in one direction only, but will not record properly if the water flows in the opposite direction for the reason that an oppositely flowing current will force the indicating liquid down in the leg of the U-tube which is opposite the slot and will permit the light to reach the sheet without encountering any intermediate object.

Another device in use records the movement of the indicating liquid in both legs of the U-tube upon a single sheet of sensitized paper but this device will not measure the amount of water flowing in either direction in the main, as the recording zones on the sensitized sheet would overlap and it would be impossible to tell in which leg of the U-tube the indicating liquid had risen.

It is to provide a manometer which will record the flow of water in either direction in the main, that I have devised my improved mechanism. Such a device is quite important on surveys where water is circulating in a shut-off district or where it is necessary to measure on several mains which cannot be shut without endangering the supply. Another advantage is that the true zero can always be ascertained by comparing the heights in both tubes, which is important at low velocities when changes of temperature changes the volume of liquid.

With the foregoing objects outlined, my invention consists in the novel features hereinafter described, illustrated in the accompanying drawing, and more particularly pointed out in the appended claims.

Referring to the drawing:

Figure 1 is a horizontal sectional view of my improved apparatus.

Fig. 2 is a vertical sectional view taken on line 2—2 of Fig. 1, certain parts being broken away for the purpose of clearness.

In the drawing, 1 designates a casing provided with a hinged door 2 for gaining access to the interior of the casing and detachably connected together.

The casing is provided with a partition 3 dividing the same into two compartments 4 and 5. Rotatably mounted in each of the compartments is a drum 6 carrying a sensitized record sheet 7. Mounted in the partition 3 is a pinion 8 meshing with gears 9 carried by the shafts 10 of the drums. One of the gears is rotated by means of a clockwork mechanism 11 and this rotates the pinion 8 and causes said pinion to rotate the other gear in the same direction as the first gear, whereby the drums are simultaneously rotated in the same direction and the sheets moved uniformly. The front of the casing is provided with two longitudinally disposed slots 12, one of which permits the passage of light to one of the drums 6 and the other permits the passage of light to the other drum.

Mounted on the front of the casing is a U-tube 13, one leg 14 of which is arranged in front of one of the slots 12, and the other leg 15 of which is arranged in front of the other slot. The legs of the U-tube are connected by pipes 16 to the bent tubes 17 and 18 of a pitometer 19 which is adapted to be inserted in the water main 20. The U-tube carries an indicating liquid such as tetrachlorid which is heavier than water. While the water to be measured is flowing through the water main, it acts on the bent tubes of the pitometer and disturbs the equilibrium of the tetrachlorid in the bottom of the tube, raising it in one leg and lowering it in the other. With my improved apparatus should the water in the main 20 be flowing in the direction of the arrow $x$, it will cause the indicating liquid to rise in the leg 15 of the U-tube, while if the water is flowing in the direction of the arrow $y$, it will cause the indicating liquid to rise in the leg 14.

In order to record the rise and fall of the indicating liquid no matter in which direction the water is flowing, I have provided the improved means heretofore described, which coöperates with a lamp 21, carried by a test box (not shown) in which the casing 1 is adapted to be inserted, so that the rays from the lamp will pass through the legs of the U-tube and slots 2 to the sensitized sheets, but will be intercepted by the indicating liquid and will record its rise and fall.

If the apparatus is used where the current flows in but one direction only, the correct zero can be ascertained by finding the line intermediate the photographic lines of the two record sheets.

The lamp 21 is preferably controlled by the clock-work 11 in the manner of an ordinary time controlled switch, so that it will flash at desired intervals.

What I claim and desire to secure by Letters Patent is:—

1. In a manometer recording apparatus, a U-tube containing an indicating fluid affected by the velocity of the water to be recorded, in combination, with a source of light and a plurality of traveling sheets of sensitized paper located within an inclosure having an exposure opening for each record sheet, each leg of said tube being interposed between the source of light and one of said exposure openings to intercept the light and photograph on the sheets movements of the indicating fluid.

2. A recording device comprising a casing, rotatable drums mounted in said casing and each carrying a sensitized record sheet, said partition being provided with an exposure slot for each of said sheets, a source of light and a U-tube containing an indicating fluid affected by the velocity of the water to be recorded, each leg of said U-tube being interposed between the light and one of said exposure slots to intercept the light and photograph on the sheets movements of the indicating fluid.

3. The combination with a pitometer, of a U-tube connected to said pitometer by fluid conveying pipes and containing an indicating liquid affected by the velocity of the water to be recorded, and means for making independent records of the movement of said indicating liquid in each leg of said tube.

4. A recording device comprising a casing having a partition dividing the same into two compartments, a rotatable drum mounted in each of said compartments and each carrying a sensitized record sheet, means for rotating said drums in the same direction, said casing being provided with an exposure opening for each of said record sheets, a source of light, and a U-tube containing an indicating fluid affected by the velocity of the water to be recorded, each leg of said U-tube being interposed between the light and one of said exposure openings to intercept the light and photograph on the sheets, movements of the indicating fluid.

In testimony whereof I affix my signature.

JOHN A. COLE.

Copies of this patent may be obtained for five cents each, by addressing the "Commissioner of Patents, Washington, D. C."